(12) United States Patent
Azgin et al.

(10) Patent No.: US 10,225,201 B2
(45) Date of Patent: Mar. 5, 2019

(54) SCALABLE MULTICAST FOR NOTIFICATION-DRIVEN CONTENT DELIVERY IN INFORMATION CENTRIC NETWORKS

(71) Applicant: Futurewei Technologies, Inc., Plano, TX (US)

(72) Inventors: Aytac Azgin, Santa Clara, CA (US); Ravishankar Ravindran, San Ramon, CA (US)

(73) Assignee: Futurewei Technologies, Inc., Plano, TX (US)

(*) Notice: Subject to any disclaimer, the term of this patent is extended or adjusted under 35 U.S.C. 154(b) by 52 days.

(21) Appl. No.: 15/417,682

(22) Filed: Jan. 27, 2017

(65) Prior Publication Data

US 2018/0219790 A1    Aug. 2, 2018

(51) Int. Cl.
| | | |
|---|---|---|
| *H04L 12/801* | (2013.01) | |
| *H04L 12/733* | (2013.01) | |
| *H04L 12/741* | (2013.01) | |
| *H04L 12/751* | (2013.01) | |
| *H04L 12/18* | (2006.01) | |

(52) U.S. Cl.
CPC .............. *H04L 47/33* (2013.01); *H04L 45/02* (2013.01); *H04L 45/20* (2013.01); *H04L 45/54* (2013.01); *H04L 45/745* (2013.01); *H04L 12/18* (2013.01)

(58) Field of Classification Search
CPC ......... H04L 47/33; H04L 45/02; H04L 45/20; H04L 45/54; H04L 45/745; H04L 12/18
See application file for complete search history.

(56) References Cited

U.S. PATENT DOCUMENTS

| | | | |
|---|---|---|---|
| 9,621,671 B2* | 4/2017 | Kim | H04L 67/327 |
| 2014/0036918 A1* | 2/2014 | Varvello | H04L 45/306 |
| | | | 370/392 |
| 2015/0350078 A1* | 12/2015 | Azgin | H04L 45/306 |
| | | | 370/392 |
| 2016/0212277 A1* | 7/2016 | Lopez | H04M 15/835 |
| 2018/0069791 A1* | 3/2018 | Dong | H04L 45/54 |

* cited by examiner

*Primary Examiner* — Duc C Ho
(74) *Attorney, Agent, or Firm* — Vierra Magen Marcus LLP

(57) ABSTRACT

The disclosure relates to technology for forwarding packets in an information centric network (ICN) A first request message, including a first packet filter and a first hop count field that indicates a number of hops the request message has traveled from a requesting node, is received at a node. The first hop count field is incremented at the node traversed by the request message, and the first request message is updated at the node by combining the first packet filter with a local filter, where the combined filter has a length matching a combination of the first hop count field and a length of the first packet filter. The first request message is then forwarded with the combined filter to the next hop node of the nodal path until reaching a destination node with a namespace.

20 Claims, 12 Drawing Sheets

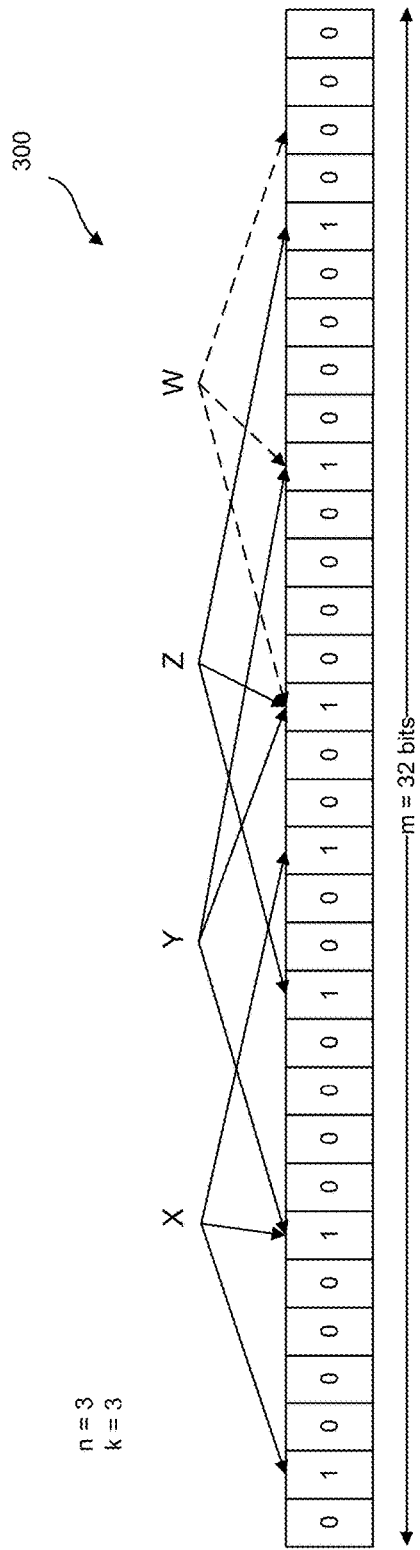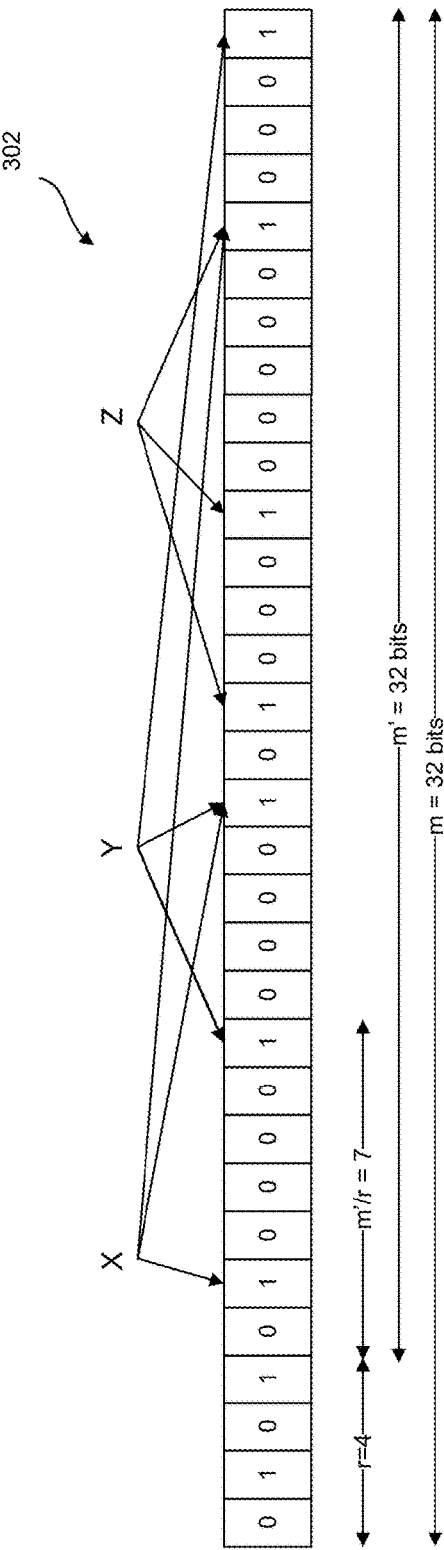
FIG. 3A
FIG. 3B

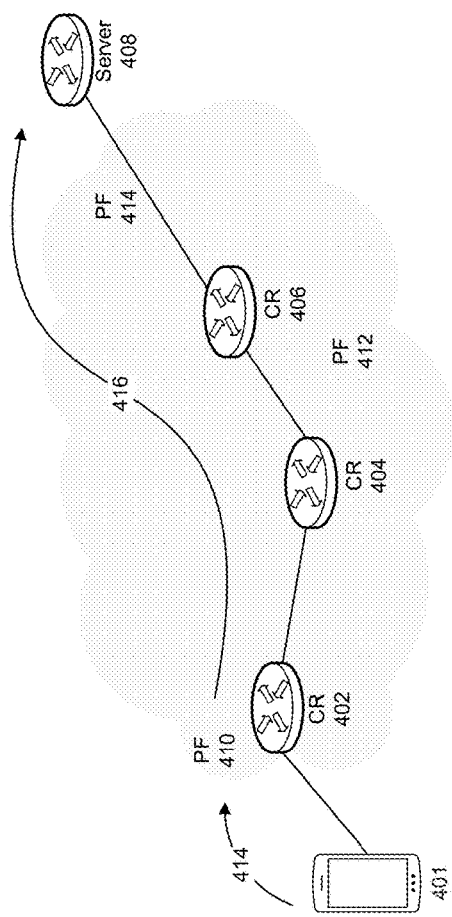
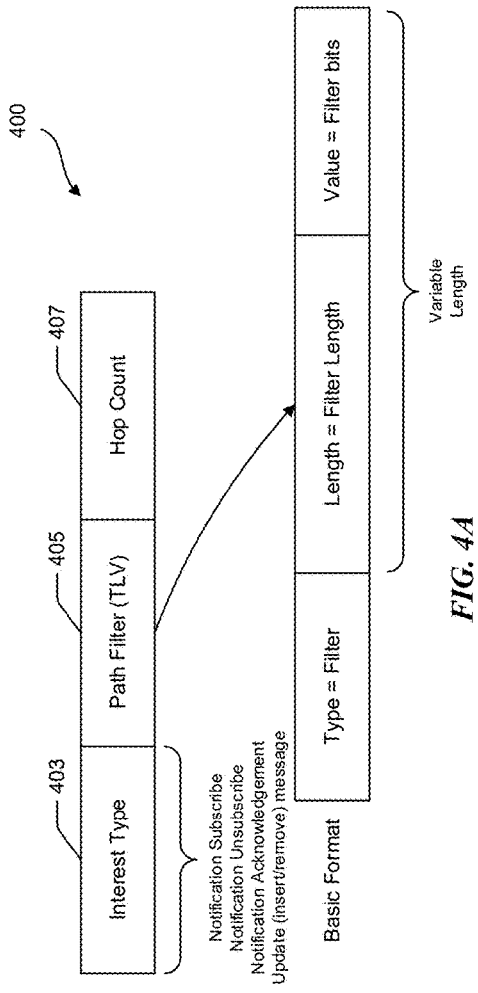

Extended Format I

| Type = Extended Filter | Length = Binary Filter Length | Value = Binary Filter bits | Length = Counter Length | Value = Counting Filter bits |
|---|---|---|---|---|

Extended Format II

| Type = Binary Filter | Length = Binary Filter Length | Value = Binary Filter bits | Type = Counting Filter | Length = Counter Length | Value = Counting Filter bits |
|---|---|---|---|---|---|

FIG. 7

| Current Hop | Binary Filter Value | Counting Filter Value | Hop Count |
|---|---|---|---|
| 1st Hop | $Filter_1$ = 0xabcd | $Counter_1$ | Hops = 1 |
| 2nd Hop | $Filter_2$ = 0xefghij | $Counter_2$ | Hops = 2 |
| 3rd Hop | $Filter_3$ = 0xklmnopqr | $Counter_3$ | Hops = 3 |

$Filter_1$ = local filter at the 1st hop matching incoming-outgoing interface $Filter_2$ = or (local filter at the 2nd hop matching incoming-outgoing interface, $f_{2,h(2)}(Filter_1)$)

$Filter_3$ = or (local filter at the 3rd hop matching incoming-outgoing interface, $f_{3,h(3)}(Filter_2)$)

$f_{i,h(i)}$ represents a transform function corresponding to the $i^{th}$ hop to convert $n_{i-1}$ bits used at the i-1th hop to $n_i$ bits used at the $i^{th}$ hop so as to create a dynamically transformed filter of length matching the local filter's length at the current hop

*FIG. 8*

SCALABLE MULTICAST FOR NOTIFICATION-DRIVEN CONTENT DELIVERY IN INFORMATION CENTRIC NETWORKS

BACKGROUND

Conventional computer networks are built from a large number of network devices, such as routers, switches, and/or other hardware. Management of a large network can be complex and costly. It is believed that the complexity can be addressed by separating the bundling of control and data forwarding in traditional routers and replacing the use of fully distributed protocols for network control with centralized protocols. For example, data forwarding (e.g., forwarding plane) is decoupled from control decisions (e.g., control plane), such as routing, resources and other management functionalities in a centrally-controlled network. The decoupling also allows the forwarding plane and the control plane to operate on different hardware, in different runtime environments, and/or operate using different models. In the centrally-controlled network, network intelligence is logically centralized in software-based controllers. Thus, network devices become packet forwarding devices that are managed and controlled by the centralized controllers.

BRIEF SUMMARY

In a first embodiment, there is a method for forwarding packets in an information centric network (ICN), comprising receiving a first request message at a node in the ICN, the first request message including a first packet filter and a first hop count field that indicates a number of hops the request message has traveled from a requesting node; incrementing the first hop count field at the node traversed by the request message along a nodal path in the ICN; updating the first request message at the node by combining the first packet filter with a local filter, wherein the combined filter has a length matching a combination of the first hop count field and a length of the first packet filter; and forwarding the first request message with the combined filter to the next hop node of the nodal path until reaching a destination node with a namespace.

In a second embodiment according to the first embodiment, the method further comprises checking a routing table at the destination node to determine whether content received in the first request message matches an existing entry, wherein the existing entry includes a second packet filter; and when a match is found, determining whether (1) the existing entry in the routing table was received by a same interface as the first request message, and (2) the combined and second packet filters are different; sending an update message to traverse the nodal path along the reverse direction towards the requesting node over the ICN until reaching a branch node; and receiving a new packet filter at the destination node in response to the update message; and updating the routing table to replace the combined and second packet filters having the same interface with the new packet filter.

In a third embodiment according to the first through second embodiments, the method further comprises forwarding a response message, including the new filter, with the content requested in the first request message to a requesting node.

In a fourth embodiment according to the first through third embodiments, the method further comprises receiving an unsubscribe message from the branch node when a number of interface counts in the routing table for the name space at the branch node is equal to 1, wherein the unsubscribe message includes an updated filter entry to replace the local filter entry; and replacing the local filter entry in the routing table at the destination node with the updated filter entry received from the branch node.

In a fifth embodiment according to the first through fourth embodiments, the method further comprises sending an acknowledgement message to the branch node to remove the local filter entry from the branch node routing table.

In a sixth embodiment according to the first through fifth embodiments, the unsubscribe message is received from the requesting node, the filter entry for the requesting node is removed from the routing table at the branch node in response to the unsubscribe message, the interface count for the namespace at the branch node is determined to be 1, and the unsubscribe message is forwarded to the destination node or another branch node.

In a seventh embodiment according to the first through sixth embodiments, the destination node is one of (1) a server node and (2) a branch node in which multiple request messages have been received from different interfaces.

In an eighth embodiment according to the first through seventh embodiments, the packet and local filters are counting bloom filters, and the combined filter is determined by a bitwise OR operation of the local counting bloom filter, selected by the branch node or the destination node, dependent upon the hop count and the length of the received counting bloom filter length, and a transformed version of the received packet's counting bloom filter.

In a ninth embodiment according to the first through eighth embodiments, the packet filters are data structures that represent a set of identifiers of all nodes in the nodal path and determines whether an element is a member of the set of identifiers.

In a tenth embodiment according to the first through ninth embodiments, the first packet filter is transformed prior to combination with the local filter when a length of the first packet filter does not match a length of the local filter.

In an eleventh embodiment, there is a non-transitory computer-readable medium storing computer instructions for forwarding packets in an information centric network (ICN), that when executed by one or more processors, perform the steps of receiving a first request message at a node in the ICN, the first request message including a first packet filter and a first hop count field that indicates a number of hops the request message has traveled from a requesting node; incrementing the first hop count field at the node traversed by the request message along a nodal path in the ICN; updating the first request message at the node by combining the first packet filter with a local filter, wherein the combined filter has a length matching a combination of the first hop count field and a length of the first packet filter; and forwarding the first request message with the combined filter to the next hop node of the nodal path until reaching a destination node with a namespace.

In a twelfth embodiment, there is a network device for forwarding packets in an information centric network (ICN), comprising a non-transitory memory storage comprising instructions; and one or more processors in communication with the memory, wherein the one or more processors execute the instructions to: receive a first request message at a node in the ICN, the first request message including a first packet filter and a first hop count field that indicates a number of hops the request message has traveled from a requesting node; increment the first hop count field at the node traversed by the request message along a nodal path in the ICN; update the first request message at the node by combining the first packet filter with a local filter, wherein the combined filter has a length matching a combination of the first hop count field and a length of the first packet filter; and forward the first request message with the combined filter to the next hop node of the nodal path until reaching a destination node with a namespace.

Any one of the above embodiments may be combined with any one or more of the other embodiments to form a new embodiment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 3A and 3B illustrate an example bloom filter and counting bloom filter.

FIGS. 4A-4C illustrate flow diagrams of a data packet traversing a network.

FIG. 7 illustrates examples of formats of the request message traversing the network depicted in FIGS. 1, 4B, 5A and 6A.

FIG. 8 is an example path filter table at different hops in along a network path.

DETAILED DESCRIPTION

Figure 1:
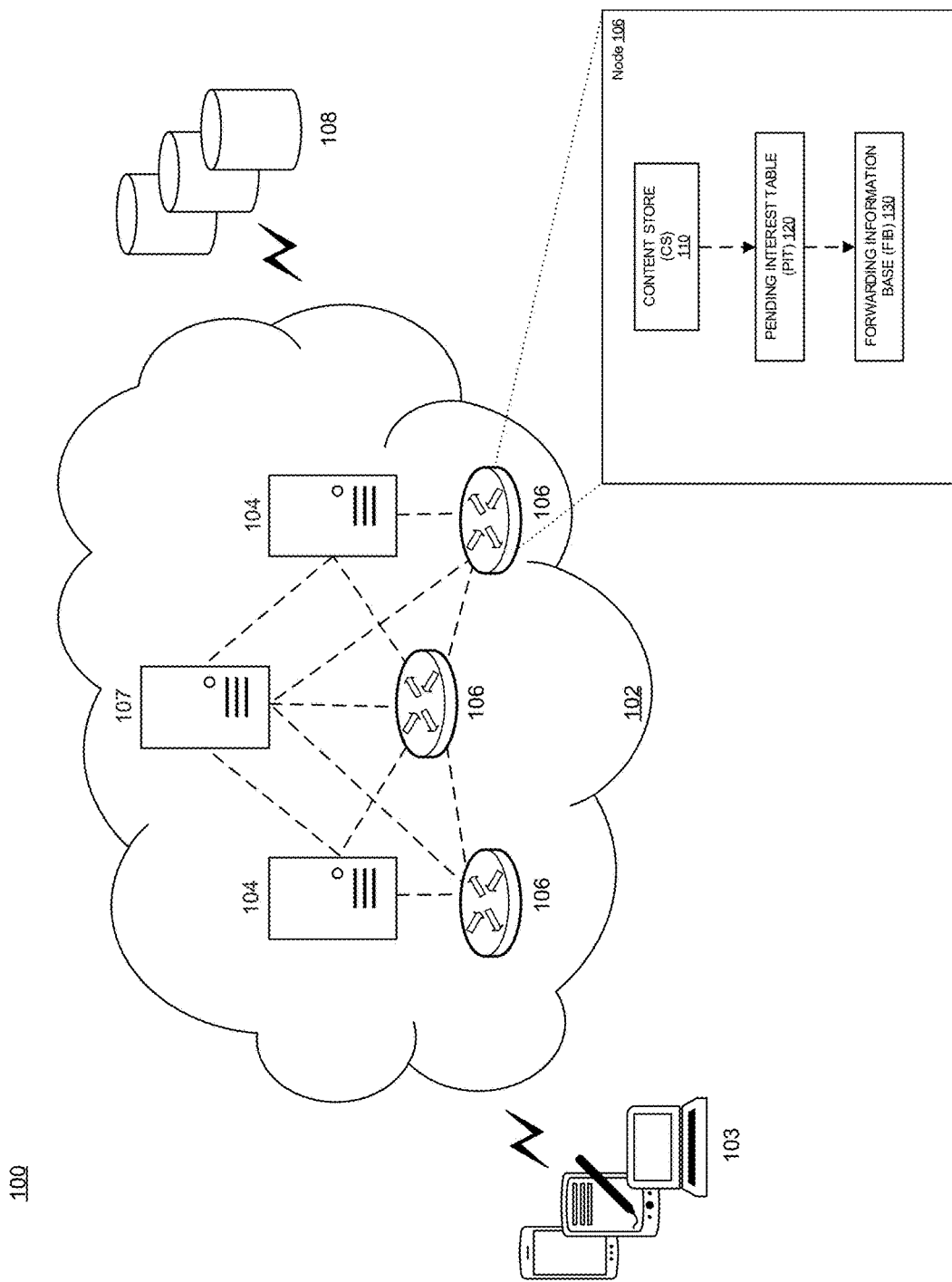
FIG. 1 illustrates a network architecture to provide content as requested by different users in an information centric network.

The disclosure relates to technology for forwarding packets in an information centric network (ICN).

A more efficient way to push information from a serving node to a requesting (subscriber) node is implemented according to the various embodiments disclosed herein. In particular, storage and signaling overhead may be reduced to thereby provide a more resource efficient operation by removing, for example, the need to record entries in a pending interest table (PIT) of the nodes within the ICN. In one embodiment, this may be accomplished by implementation of counting bloom filters.

In another embodiment, a requesting node (or end host) sends a request (subscribe) message to the serving node with a filter (for example, to join a multicast session or a stream serviced by the serving node), where the filter is updated along each hop in the network until the request is received by either the serving node or an intermediate branch node (i.e., a node that has received requested targeting the same namespace over at least two interfaces). More specifically, as the request message arrives at each node, the incoming filter is transformed and combined with a filter stored in the local filter mapping table. In another embodiment the received filter is stored within the namespace mapping table, which is used to create path information and help with forwarding packets in certain scenarios, for example, to implement multicast-based content delivery, and such table can also refer to a semi-stateful routing/forwarding table (or routing table), which can coexist with but operate independent of the local forwarding information base/routing information base (FIB/RIB), with, for example, multicast pushing of data to subscriber nodes representing one scenario. The local semi-stateful routing/forwarding table is then updated at the serving node or intermediate branch nodes to reflect the combined filter, and at the intermediate branch nodes, the combined filter is forwarded to the next hop node for continued processing until reaching the serving node or an intermediate branch node.

The network also processes a request (unsubscribe) message from a requesting node to remove the node (subscriber) from the multicast group for the subscribed session or stream (or to remove the node information associated with the previously subscribed session from the corresponding network nodes), as well as update the local semi-stateful routing/forwarding table at a respective intermediate branching node upon such a request.

It is understood that the present embodiments of the invention may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the invention is intended to cover alternatives, modifications and equivalents of these embodiments, which are included within the scope and spirit of the invention as defined by the appended claims. Furthermore, in the following detailed description of the present embodiments of the invention, numerous specific details are set forth in order to provide a thorough understanding. However, it will be clear to those of ordinary skill in the art that the present embodiments of the invention may be practiced without such specific details.

FIG. 1 illustrates a network architecture to provide content as requested by different users in an information centric network. The network environment 100 may include the ICN 102, also referred to as a content oriented network (CON), having controllers, such as ICN managers 104. The ICN managers 104 may be, for example, a network entity that may have control over a set of network resources in a data plane. In one embodiment, the ICN managers 104 maintain a synchronized record of content hosted by different network entities in the ICN 102. For example, the ICN functionalities may include ICN name resolution, routing, and management. The ICN managers 104 may be deployed in a distributed or in a centralized or in a hybrid manner depending upon the Internet Service Providers (ISP).

ICN 102 may also include routers (or nodes) 106, which may include storage to cache content as the content propagates through the ICN 102. The routers 206 may also be communicatively coupled with the ICN managers 104 and may be configured to process requests received from users for accessing the content via clients or user devices 103, such as a mobile device or computer.

The routers 106 may collaborate for caching content with one or more other routers 106 in the network, such as an ICN, which may be configured as follows. A router 106 may comprise a content store (CS) 110, pending interest table (PIT) 120, and FIB 130. The CS 110 may be used (e.g., in a storage or memory unit) to cache (for relatively short time) or store (for relatively longer time) content data. The CS 110 may also receive and associate interests (user requests for content) with corresponding content data (requested content).

The PIT 120 may be any data structure (e.g., a table, list, or database) used to record and keep track of the received interests (requests for content) that are being served or pending (until the corresponding requested content data is received). The interests may be associated in the PIT 120 with the next hops (or next hop interfaces or faces) of the collaborative caching router 106 on which the interests were received.

The FIB 130 may be any data structure (e.g., a table, list, or database) used to associate content or namespace with corresponding ports or faces (for next hops) on which the interests and content data are received and forwarded, depending on the implemented forwarding policies. The FIB 130 entries may indicate the next hops on which content or packets (interests and data) may be forwarded. The FIB 130 may be a data structure or a sub-data structure (e.g. a data structure within a data structure), such as a table, list, or database which may be maintained and operated (to process content interest and data) at a data plane or forwarding plane. The data plane may comprise operations for transferring content information (interest and data) in the CON, and the control plane may comprise operations related to controlling network operations including the data plane operations. The data structures above may be stored and maintained in a storage or memory unit of the router 106.

To carry out the Interest and Data packet forwarding functions, the router 106 maintains the three data structures described above, namely: (1) a CS 110 acting as a temporary cache of Data packets the router has received, which cached Data packets may be used to satisfy future Interests; (2) a PIT 120 to store all the Interests (or a subset of them for which stateful forwarding is enabled) that a router has forwarded but not satisfied yet, where each PIT entry records the data name carried in the Interest (or a router designated name associated with the Interest), together with its incoming and outgoing interface(s); and (3) a FIB 130 as a routing/forwarding table which maps name components to interfaces, and is populated by a name-prefix based routing protocol for instance through the routing information base (RIB) for which the name prefix based routing protocol originates, and can have multiple output interfaces for each prefix. Additionally, the router 106 may include forwarding policies and rules to handle forwarding of packets.

In one example embodiment, when the router 106 receives an Interest packet (incoming interest), which includes for example the name of the content that the requester (client) wants to request, the router 106 first checks to determine if there is a locally cached copy of the content in the CS 110. If a locally cached copy of the content exists in the CS 110, the router 106 can reply to the Interest by sending the content copy to the incoming face of the Interest.

If no locally cached copy of the content exists, the content router 106 checks to determine if there are pending interests in the PIT 120 with the same content name. If a request targeting the same content name exists and is pending, then the incoming face of the new Interest is added to the face list for the content name in the PIT 120. Accordingly, the new interest is no longer required to be forwarded.

Otherwise, the router 106 forwards the Interest by performing a lookup, such as a longest-prefix matching based lookup, in the FIB 130 based on the content name. The Interest is then stored in the PIT 120 by creating a new entry. If no matched entry is maintained in the FIB 130, then the Interest is either dropped forwarded to a face or a multiple of faces other than the incoming face, depending on the forwarding strategy implemented by the receiving router.

The network environment 100 may further include content or data stores 108, which may store the content or collections of content, such as files, images, videos, and the like. Accordingly, the managers 104 and the routers 106 may communicate with the data stores 108 to provide the content to different users. Additionally, the network environment 100 may include one or more user devices 110, including for example and without limitation, desktop computers, handheld devices, laptops or other portable computers, network computers, mobile phones, landline phones, and the like.

Figure 2:
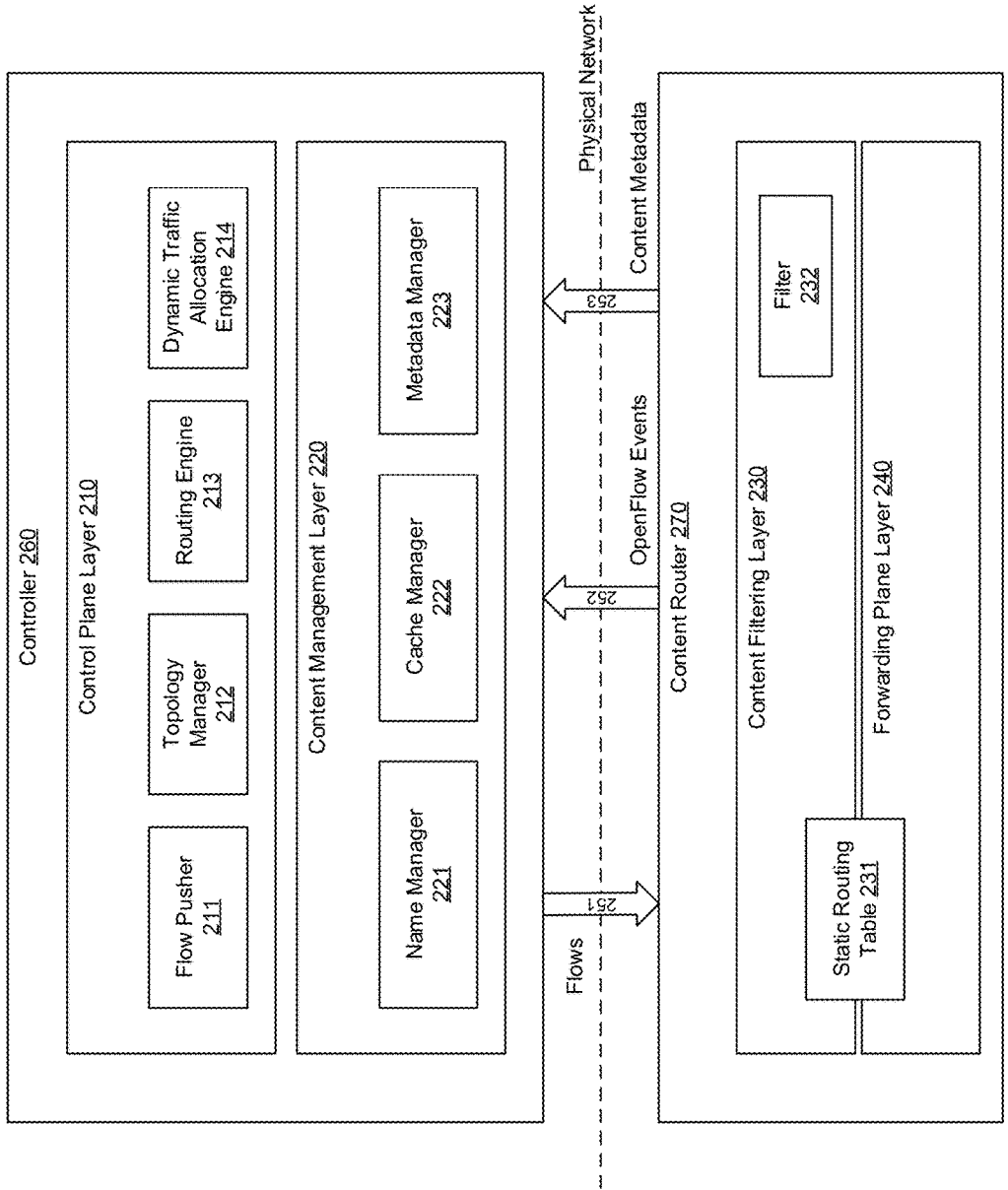
FIG. 2 illustrates an example content router and controller in accordance with FIG. 1.

FIG. 2 illustrates an example content router and controller in accordance with FIG. 1. A network, such as ICN 102, may comprise a controller 260 (such as ICN manager 104) and a content router 270 (such as content router 106). The controller 260 and the content router 270 may communicate via flows 251, OpenFlow events 252, and/or content metadata 253 through the ICN 102. For example, the flows 251 may carry configurations (e.g. network forwarding paths) for the content router 270, the OpenFlow events 252 may carry events (e.g. statistic reports) that occur at the content router 270, and the content metadata 253 may carry content attributes (e.g. content prefix sizes).

The controller 260 may comprise a control plane layer 210 and a content management layer 220. The control plane layer 210 may be substantially similar to a software defined network (SDN) control plane. For example, the control plane layer 210 may comprise a flow pusher 211, a topology manager 212, a routing engine 213 and a dynamic traffic allocation engine 214.

The topology manager 212 may be configured to manage, build, and maintain a global network topology view of the ICN 102 including, for example, networks nodes (e.g., content router 270) and corresponding interconnections.

The routing engine 213 may be configured to compute forwarding paths and determine the best paths (e.g., flows) through the ICN 102.

The flow pusher 211 may be configured to push the paths for flows to the content router 270.

The dynamic traffic allocation engine 214 may be configured to dynamically allocate network resources to transport traffic in the ICN 102 and may adapt to changes in network conditions and/or network deployments.

The content management layer 220 may be an augmented layer to the control plane layer 210. The content management layer 220 may manage content, content caching, and content routing rules in the ICN 102 in addition to the SDN control and management functions performed in the control plane layer 210. For example, the content management layer 220 may comprise a name manager 221, a cache manager 222, and a metadata manager 223.

The name manager 221 may be configured to manage contents, contents' identifications, contents' naming, and/or content semantics (e.g. mappings to TCP/IP semantics in an IP-based network).

The cache manager 222 may be configured to manage and control contents for caching, content caching locations, and/or content request statistics in the ICN 102.

The metadata manager 223 may be configured to track and maintain attributes and/or any other auxiliary data (e.g., length of content prefixes, etc.) associated with the contents tracked and/or monitored by the controller 260 (e.g., at the name manger).

In an embodiment, the cache manger 222 may classify contents according to some popularity measures, determine the types of contents for caching and/or caching locations, and/or determine content routing rules (e.g., operate in conjunction with routing engine 213 in the control plane layer 210) according to the popularity measures. For example, the cache manager 222 may classify content popularities into categories. The cache manager 222 may also update popularity classification of contents and/or re-allocate caches and/or re-distribute content routing rules, for example, according to statistics of content request and/or access frequencies.

The content router 270 may include a forwarding plane layer 240 and a content filtering layer 230. The forwarding plane layer 240 may be substantially similar to a SDN forwarding plane in which data forwarding is performed according to flow tables configured by the controller 260. The content filtering layer 230 may be an augmented layer to the forwarding plane layer 240 and may interact with the content management layer 220 in the controller 260 for content routing.

The content filtering layer 230 may filter incoming content requests from clients (such as clients or user devices 103) prior to directing the forwarding plane layer 240 to forward the requests. For example, the content router 270 may include a routing table 231 (such as FIB 130) located across both the forwarding plane layer 240 and the content filtering layer 230 and a bloom filter 232 located in the content filtering layer 230.

The routing table 231 may comprise a plurality of routing rules (e.g. local rules) for a first content type (e.g., popular contents). The bloom filter 232 may be configured as a content indicator to indicate contents of a second content type (e.g., less popular contents) different from the first content type. For example, the bloom filter 232 may comprise encoded hashed content names for the second content type. The content filtering layer 230 may direct the forwarding plane layer 240 to forward content requests that are different from default routing paths based on filtering results.

In an embodiment, when the content router 260 receives an incoming request for a content, the content filtering layer 230 may process the request prior to passing the request to the forwarding plane layer 240. The content filtering layer 230 may check the request against the routing table 231 to find an entry associated with the requested content. If an entry is found in the routing table 231, the content filtering layer 230 may direct the forwarding plane layer 240 to route the request according to the routing rule in the entry.

If an entry is not found in the routing table 231, the content filtering layer 230 may check the request against the bloom filter 232 to determine whether the requested content matches one of the less popular contents in the bloom filter 232. If a match is found, the content filtering layer 230 may send a query to the controller 260 to request the controller 260 to resolve a location for the request. In response to the request, the controller 260 may return a forwarding path. After receiving the forwarding path, the content filtering layer 230 may direct the forward plane layer 240 to forward the request according to the received forwarding path. If a match is not found in the bloom filter 232, the content filtering layer 230 may forward the request according to a default path (e.g., a default IP route for IP-based network or towards an origin server of the contents for content centric networking (CCN)). An example flow of an incoming request traversing a path in the network is described below with reference to FIGS. 4A-4C.

FIGS. 3A and 3B illustrate an example bloom filter and counting bloom filter. As shown in FIG. 3A, bloom filters 300 may be probabilistic data structures that may apply to a variety of applications. A bloom filter may be an array of m bits representing n elements. An element (of a set of data or information) may be added in a bloom filter by applying k hash functions on the desired property (e.g., a piece of information, such as content name, or the whole content object, or a property of an object, etc.), where the output of the hash functions may be an integer in the range of 0 to (m−1), inclusive. The hash functions may be fixed for a given bloom filter. The k bits corresponding to the k hash function results may be set to 1. To query for the presence of a particular object, the same k functions may be applied on the same property of the object, and the corresponding bits of the bloom filter may be tested. If the bits are all set to 1 there is a high probability that this object is represented in the bloom filter.

In the example of FIG. 3B, the bloom filter 300 includes m=32 bits, n=3, elements x, y and z and k=3 hash functions. Element w may be tested for inclusion as an element in the bloom filter and determined to be non-inclusive.

A bloom filter can result in false positives (i.e., a positive result may be obtained for an item that is not in the set) but not false negatives (i.e., a bloom filter can definitively tell when an item is not a member of the set). A group of bloom filters, one for each prefix length, can be queried in parallel leading to a secondary lookup in a hash table for each filter that finds a match. Various optimizations may be used to adapt to different prefix distributions, such as an initial direct lookup array for the first few prefix lengths that may have very few entries.

In one embodiment, and to overcome the false negative in a bloom filter with a high probability, the bloom filter is replaced with a counting bloom filter. Counting bloom filters provide a way to implement a delete operation (as opposed to an add operation) on a bloom filter without having to recreate the filter. In a counting bloom filter the array positions (buckets) are extended from being a single bit to being an n-bit counter. The insert operation is extended to increment the value of the buckets, and the lookup operation checks that each of the required buckets is non-zero. The delete operation then consists of decrementing the value of each of the respective buckets.

For example, a coding scheme of the counting bloom filter is to divide the bloom filter bit vector into r regions of m'/r bits each, where m' is the original m minus the extension header bits. As shown in FIG. 3B, the extension uses r bits to code with 0 collision-free region and with 1 a non-deletable region. The probability of element deletion, i.e., the changes of an element having at least one bit in a collision-free region, can be approximated to: $p_d=(1-(1-pc)^{m''/r})^k$. In the example of FIG. 3B, m=32, k=3 and r=4, representing the set x,y,z. The 1's in the r bits indicate that a collision happened in the corresponding region and bits therein cannot be deleted. Since each element has at least one bit in a collision-free zone, all of them are deletable.

Figure 4C:
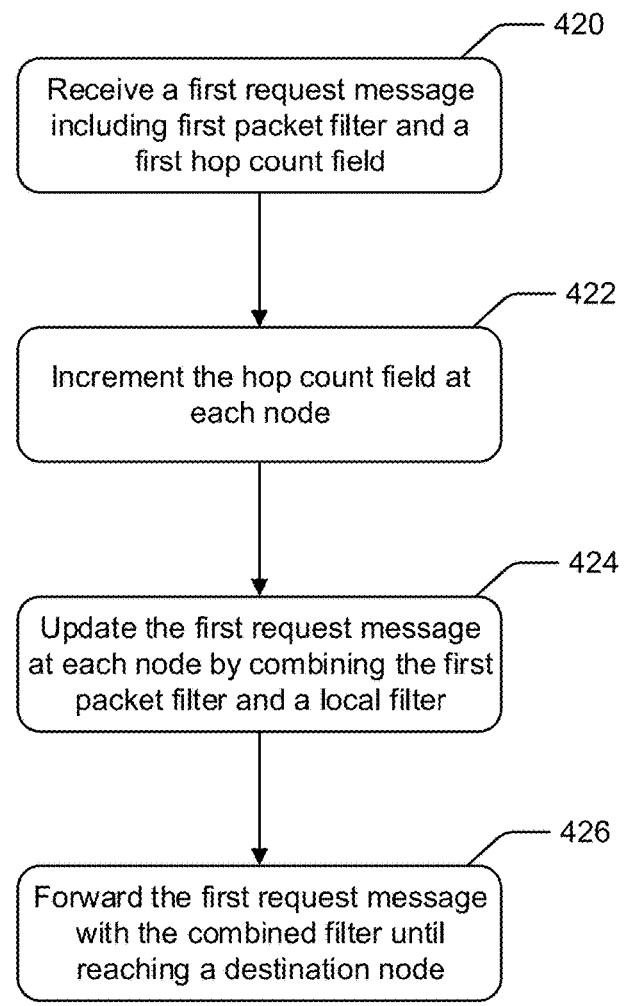

FIGS. 4A-4C illustrate flow diagrams of a data packet traversing a network. FIG. 4A illustrates an example of an interest packet that may traverse the networks disclosed in FIGS. 4B, 5A and 6A. The interest packet 400 (also referred to herein as a data packet or request message) includes an interest type field 403, which in this case is a notification to subscribe, unsubscribe or acknowledge. The path filter field 405 includes a dynamic path filter that defines the length of the filter. In one embodiment, the length of the dynamic path filter is variable. The path filter field 405 may also contain a dynamic filter that may be used to control stateless forwarding of the request message 400. The request message 400 also includes a hop count field 407, which keeps track of the count value at each node (e.g., requesting node, content router, branch node, destination node, server, etc.) traversed by the request message. The dynamic filter may also be referred to herein as a "packet filter," and may comprise various formats, including, but not limited, to those described below with reference to FIG. 7.

Although a limited number of requesting nodes (subscribers) 401, content routers 402-406 and sever 408 are illustrated in the disclosed embodiment, it is appreciated that any number of subscribers, routers and nodes may appear in the network. Here, the flow has been simplified for ease of discussion. In particular, FIGS. 4B and 4C illustrate a flow initialization whereby the requesting node 401 sends a request message 400 along the path 414 to content router 402, where a packet filter may be created at the content router 402. The path filter may be, for example, k-bits long, where k depends on the number of existing interface count at the content router 401 such that the hop count is set to 1.

With reference to FIG. 4B, the packet filter PF 410 is added to path filter field 404 in the request message 400 (i.e., the request message 400 is updated with the filter) and is forwarded to the next hop content router 404. At content router 404, the packet filter 410 in request message 400 is extracted and modified (i.e., updated), and the updated filter PF 412 is added to the request message 400. The content router 404 also increments the hop count and finds a matching filter corresponding to (k+m) bits, where m in this example is assumed to be 8. For example, a $(k+m,l)^{th}$ sub-filter of the $(k+m)^{th}$ sub-filter group, corresponding to the $l^{th}$ filter at level (k+m), where the positive integer $l<=2^k$, representing the filter for the matching interface couple corresponding to the incoming-outgoing interfaces, which is finalized with the FIB look-up. The sub-filter group is assumed to be a long byte array consisting of all of the local filters at that level corresponding to interfaces (e.g., level1 sub-filter group would be equal to =LF1: LF2: LF3: . . . $LFk_{max}$, where LF1 represents the $1^{st}$ sub-filter within the level-$1^{st}$ sub-filter group, which can also be referred as the $(k+m)^{th}$ sub-filter group, where k=0, and m=8, in which case $k_{max}$ would be equal to 256.

The updated request message 400 is then forwarded to the next hop content router 406, where the packet filter PF 412 is again updated, the hop count incremented and the updated request message 400, including the updated packet filter PF 414, forwarded along a path 416 until reaching a destination node, such as server 408.

At server 408, the semi-stateful routing/forwarding table is updated with entries received in the request message 400, including the most recently modified (or updated) packet filter 414, for a specified namespace along the interface from which the server 408 received the request message 400. For example, in the network depicted in FIG. 4B, server 408 receives the request message 400 from content router 406, with packet filter PF 414 (i.e., packet filter PF 412 combined with the local filter at content router 406).

FIG. 4C illustrates a flow diagram of processing a request message in accordance with FIG. 4B. The request message may be transmitted as a packet, and may therefore be referred to as a request or interest packet. The request packet may be compliant with an ICN protocol, in one embodiment. In another embodiment, the request packet is compliant with an NDN packet format specification. In another embodiment, the request packet is compliant with a CCNx packet format specification. However, it is appreciated that other packet formats may be utilized.

Moreover, the process disclosed in FIG. 4C may be practiced in the environment 100 of FIG. 1, but is not limited thereto. The process of FIG. 4C may be performed by various elements (e.g., routers 106) in FIG. 1, but is not limited to that example network environment 100. For example, a single router 106 may perform all of the steps in the process. It is also appreciated that multiple routers 106 may perform the process to route the request message in a stateless manner.

Employment of a packet (in-packet) filter by content routers enables stateless forwarding at routers with no entries in the local namespace mapping table and removes the need to record entries in a PIT at each of the content routers. The elimination of a PIT from content routers in the ICN 102 reduces the amount of memory employed by the content routers, reduces network latency issues that may be caused because of a large PIT size, and improves overall packet forwarding performance in the ICN 102 since the local memory requirements of content router necessary to support reverse path forwarding may no longer depend on traffic characteristics.

A request message is received at step 420 from a requesting node 401 on an ingress (otherwise referred to as arrival or inbound) interface of content router 402. The request message 400 includes, for example, an in-packet filter (packet filter) and a hop count field that indicates the number of hops the request message has traveled from a requesting node 401. The content router 402 creates a packet filter and sets the hop count to 1 (as this is the first hop in the network). The packet filter PF 410 is added to the request packet 400, and the request packet 400 is forwarded via the egress interface of the content router 402 to the next hop.

At 422, the request message is received by content router 404 with the filter PF 410 created at content router 402. The content router 404 increments the hop count field in the request message 400 and searches for a matching filter (a filter matching the in-packet filter) in the local semi-stateful routing/forwarding table. In one embodiment, a value of the hop count field will be applied as part of combining the in-packet filter with local filters at each of the content routers 402-406 as the request message 400 traverses a nodal path in the network.

In one embodiment, the content router 406 extracts the packet filter PF 410 from the request message 400, updates the filter, adds the updated filter PF 414 to the request message 400 and forwards the request message 400 with the updated filter PF 414 to the next hop router. The updated packet filter PF 414, in one embodiment, is a combination of the in-packet filter with a local filter at the current router. The in-packet filter is first transformed (i.e., hashed) at the current router and then combined with the local filter such that the combined filter has a length matching a combination of the value of hop count field and a length of the in-packet filter.

In the above-mentioned transformation of the in-packet filter, a transform operation converts the received (in-packet) path filter to the correct size used by the content router 402, based upon the received filter length, hop count, and local specifications. Depending on the implementation, if a counting bloom filter is implemented as two separate components, such as a bloom filter and a counting filter, then the content router 402 applies an OR operation on the bloom filter portion, while setting (if zero) or incrementing the counters corresponding to the set bit locations within the counting filter. Such operation can be also represented by summing up the integrated filters, where the counting bloom filter is implemented as one filter, with s bits, where s=c*l, l represents the number of elements for the bloom filter and c represents the number of counter bits associated with each element of bloom filter. As illustrated in FIG. 4C, extracting and updating the filter in the request message 400 is one embodiment of 424. Forwarding the request message 400 to the next hop router is one embodiment of 426.

Figure 5A:
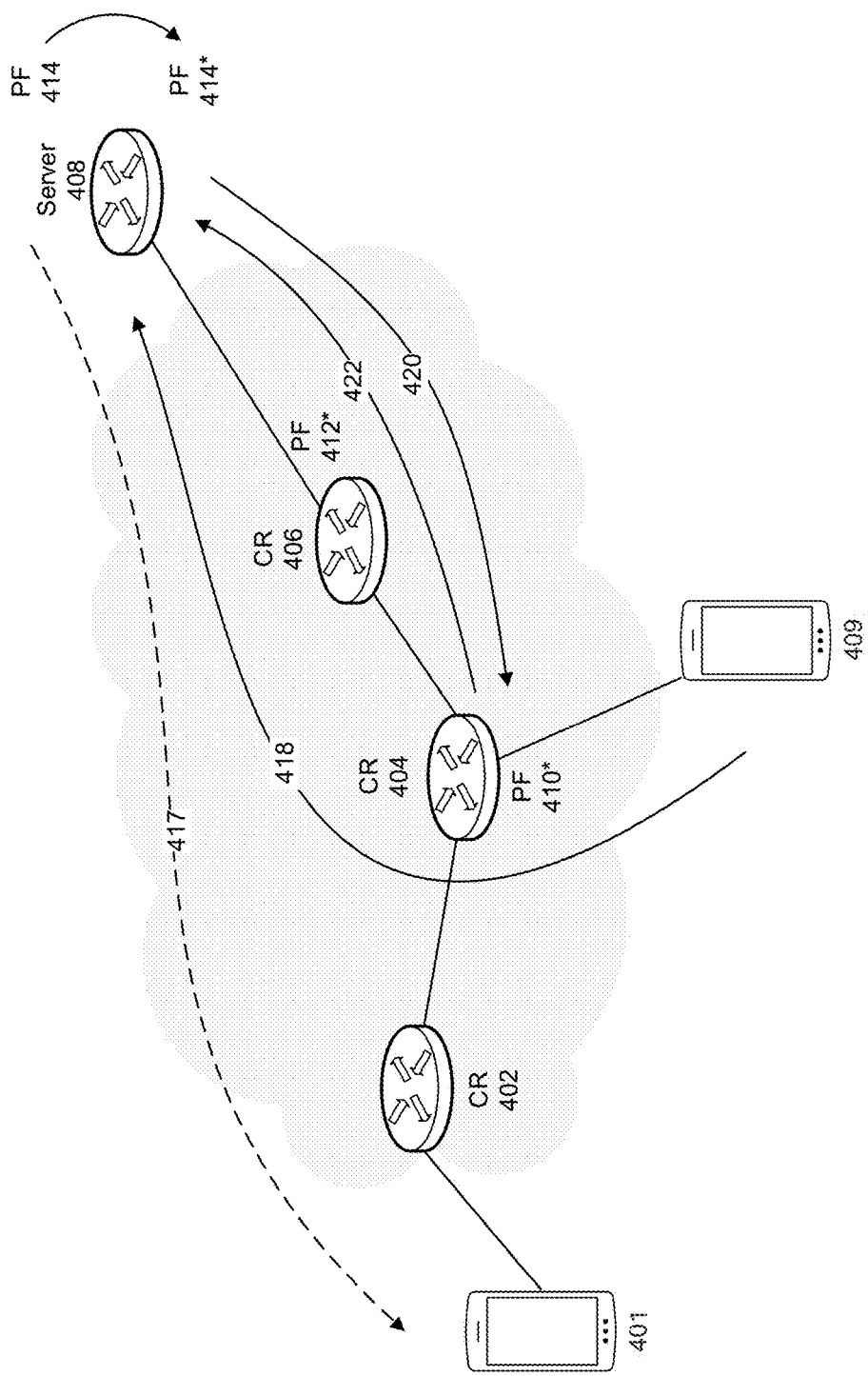
FIGS. 5A-5B illustrate flow diagrams of a data packet traversing a network in accordance with FIGS. 1, 4B and 4C.
Figure 5B:
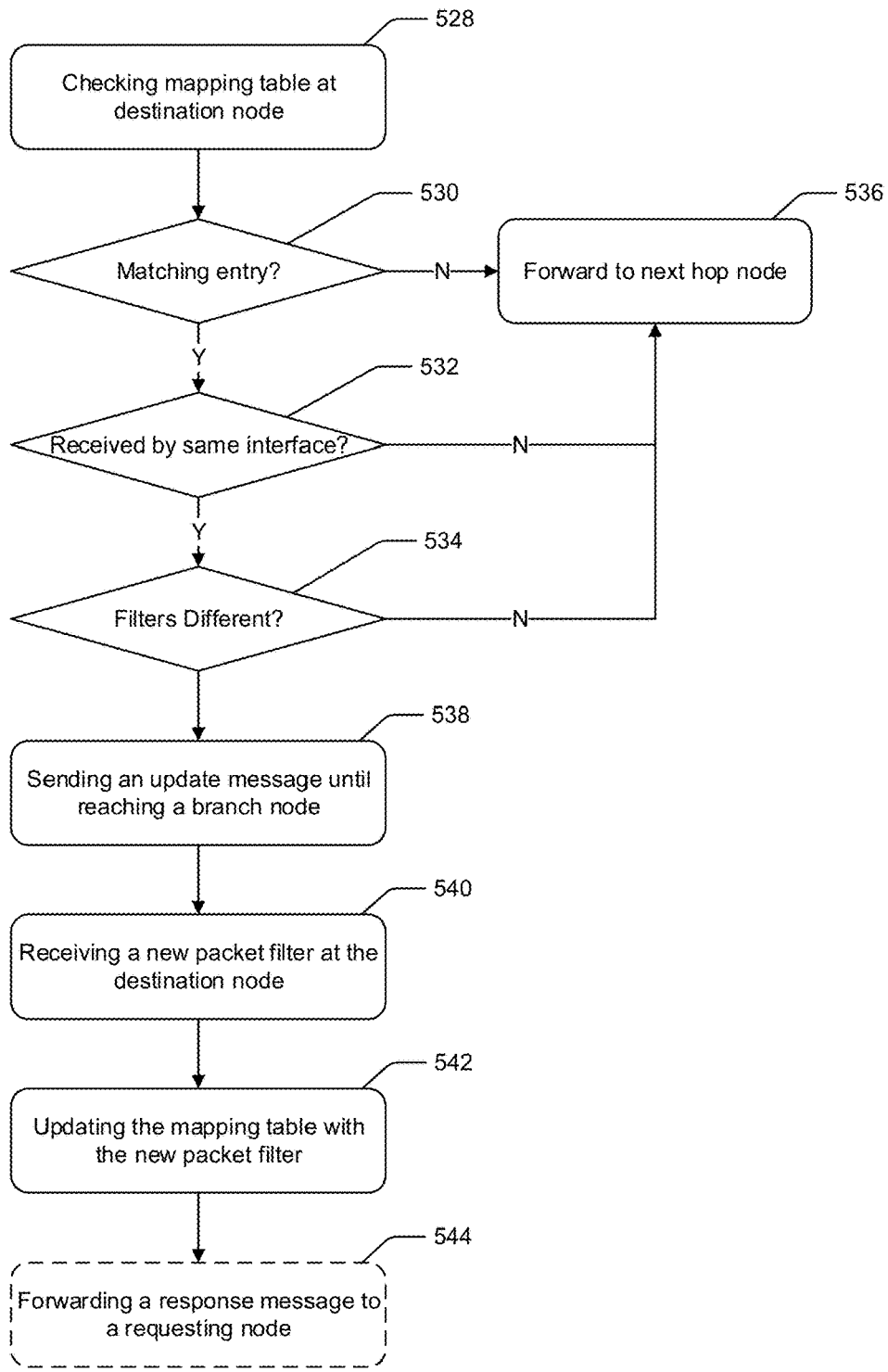

FIGS. 5A-5B illustrate flow diagrams of a data packet traversing a network in accordance with FIGS. 1, 4B and 4C. Although a limited number of requesting nodes (subscribers) 401, content routers 402-406 and server 408 are illustrated in the disclosed embodiment, it is appreciated that any number of subscribers, routers and nodes may appear in the network, similar to FIG. 4B. Here, the flow has been simplified for ease of discussion. In particular, FIGS. 5A and 5B illustrate flow diagrams of subscribing to the network after the initiation process in accordance with FIGS. 4B and 4C.

With reference to FIG. 5A, it is assumed that path 417 (the path between requesting node 401 and server 408) was set up during the process disclosed in FIG. 4B. Similarly, the semi-stateful routing/forwarding table at server 408 currently stores an entry including packet filter PF 414 for the desired namespace (e.g., Nns-A) based on the initial subscription received from requesting node 401. For example, the entry stored in the local semi-stateful routing/forwarding table at server 408 may be 'NnsA:PF 414; (Server 408-CR 206)' (namespace:filter:interface).

In the example, another requesting node (subscriber) 409 also wants to subscribe to the same namespace Nns-A as the requesting node 401, and sends a request message 400 along path 418 to server 408 using the same procedures described above with in FIG. 4B (the details of which are not repeated). As the request message 400 traverses each node (e.g., content router) along path 418, a packet filter PF 410* is created at content router 404, inserted into the request message 400 and forwarded to the next hop router (e.g., content router 406). Upon reaching the content router 406, the packet filter PF 410* is updated (as explained above) and forwarded to server 408 in the request message 400 as updated packet filter PF 412*.

After the server 408 receives the request message 400 from the requesting node 409 over the same interface (i.e., server 408-to-content router 406), the server 408 determines whether an existing entry in the local semi-stateful routing/forwarding table exists for the same namespace (Nns-A) along the same interface (i.e., egress interface towards content router 406) with different packet filters.

Recall that during the initiation process described in FIG. 4B, server 408 received the request message 400 from content router 406, with packet filter PF 414 (i.e., packet filter PF 412 combined with the local filter at content router CR 406). Here, the server 408 is receiving a request message 400 that includes packet filter PF412* (different from PF414) targeting the same namespace (Nns-A) along the same interface pointed by PF 414 (i.e., the egress interface towards content router 406).

In response to receiving a different packet filter for the same namespace along the same interface, server 408 pushes an update message (in the reverse direction along the downstream path 420) towards the requesting nodes (subscribers) 401 and 409. The update message includes information of the two different packet filters PF414 and PF 412* that have been received at server 408 during each requesting node's subscription. For example, the update message includes the namespace: filter1: filter2, such as Nns-A: PF 412*: FP 414.

The update message is forwarded downstream until reaching a branch node (e.g., content router 404). In one embodiment, a branch node is defined as a node in which multiple request messages 400 have been received over different interfaces. For example, content router 404 has a request message 400 coming from requesting node 401 and requesting node 409 over different interfaces.

In one example of forwarding the update message downstream until reaching a branch node, server 408 sends the update message to content router 406. At content router 406, the packet filter (PF 412*, PF 414) included in the update message is checked against the filter-utilizing local routing table entries to determine the egress (outgoing) interfaces for the outgoing message downstream towards content router 404. As the egress interfaces for packet filters PF 412* and PF 414 are the same, no update is required at content router 406 to create an entry in local namespace mapping table. Accordingly, the update message is updated with the entry (Nns-A, PF 410*: PF 412), which is obtained by removing the local filter from the received filters PF 412* and PF414, and is forwarded downstream along the reverse direction towards content router 404.

Content router 404, upon receiving the update message from content router 406, determines that it is the branch node since the received packet filters (PF 410* and PF 412) match to different interfaces, as determined by matching entries in the local routing table. Accordingly, the content router 404 creates an entry for the namespace (Nns-A) in the local namespace mapping table (e.g., Nns-A: PF 410: content router 404—content router 402: no filter or a 0 valued filter (as subscriber 409 sends subscription message with no filter component) or the forwarded filter PF 410 (even though it may not be necessary)—content router 404—subscriber 409), and sends a response message (e.g., an update-remove message) to the server 408. The update-remove message sent to the server 408 includes the new filter created at the content router 404 to create information on the content router-to-server path 222. In one embodiment, content router 404 creates a 0-valued filter as its namespace mapping table already includes entries with outgoing interface information. In another embodiment, content router 404 creates a filter identifying only the outgoing interface information towards content router 406.

Once the server 408 receives the update-remove message with the newly created filter on the namespace Nns-A, the local filters PF 414 and PF 412* (the current set of filters in the local namespace mapping table) is replaced with the newly received filter (PF 414*) corresponding to the single incoming interface pointing towards the content router 406, such that the entry becomes Nns-A; PF 414*: server 408—content router 406.

The process disclosed in FIG. 5B may be practiced in the environment 100 of FIG. 1, but is not limited thereto. The process of FIG. 5B may be performed by various elements (e.g., routers 106) in FIG. 1, but is not limited to that example network environment 100. For example, a single router 106 may perform all of the steps in the process. It is also appreciated that multiple routers 106 may perform the process to route the request message in a stateless manner. In particular, the process of FIG. 5B relates to a subscriber message being sent from a requesting node (subscriber) to a destination node, such as a server or content producer.

At the destination node 408 (e.g., server), the local namespace mapping table is checked to determine whether content received in the request message 400 matches an existing entry in the local namespace mapping table at 528, where the existing entry includes a stored filter. For example, the server 408 may currently store an entry associated with namespace Nns-A, packet filter PF 414 and pointing towards the (server 408—content router 406) interface. In one embodiment, a destination node is a server node (such as a content producer, where the content is generated for the given namespace, or content is shared as a repository). In another embodiment, the destination node is a branch node (such as content router 404).

When an incoming request message 400 received at the server 408 has a matching entry as determined at 530, the namespace mapping table at the server 408 is checked to determine whether (1) the existing entry in the namespace mapping table was received over a same interface as the first request message at 532, and (2) the received first and second packet filters are different at 534. If any one of the determinations at 530-534 is false (N), then the request message 400 is forwarded to the next hop router at 536, in upstream directions towards the destination node (if the server node is not the content publisher or the content producer). Otherwise, if all the determinations 530-534 are true, the process continues to 538.

At 538, the server 408 sends an update message to traverse the nodal path 220 along the reverse direction towards the requesting node 409 over the ICN 102 until reaching a branch node (i.e., content router 404). Once the update message is received at the branch node 404 (as explained above), the branch node 404 creates a new packet filter and sends it back toward server 408 in an update-remove message.

The server 408 receives the new packet filter in response to the update message at 540 and updates the local namespace mapping table to replace the filter currently stored in the local namespace mapping table with the new packet filter having the same interface at 542.

The server 408 may optionally send a response message, including the new filter with the content requested in the request message 400 to the requesting node at 544. For example, the content requested is forwarded to the requesting node (subscribers) 401, by processing the filters to find an interface until reaching the requesting node 401 or an branch node (e.g. content router 404), and updating the filter by replacing the packet filter with the one stored at the branch node's namespace mapping table before forwarding to the next hop.

Figure 6A:
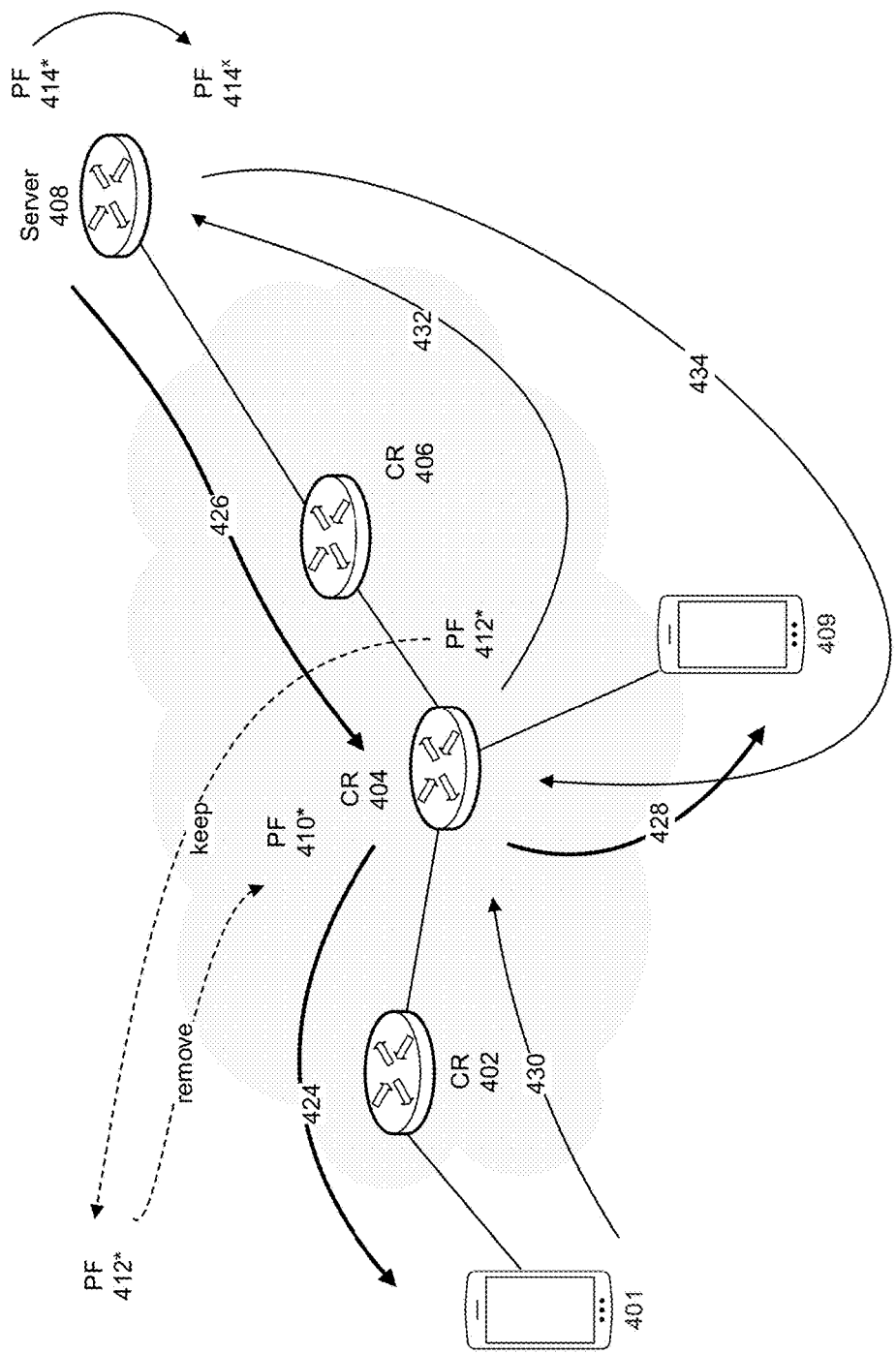
FIGS. 6A-6C illustrate flow diagrams of unsubscribing to the network after completion of subscribing to the network in accordance with FIGS. 4B and 4C.
Figures 6B, 6C:
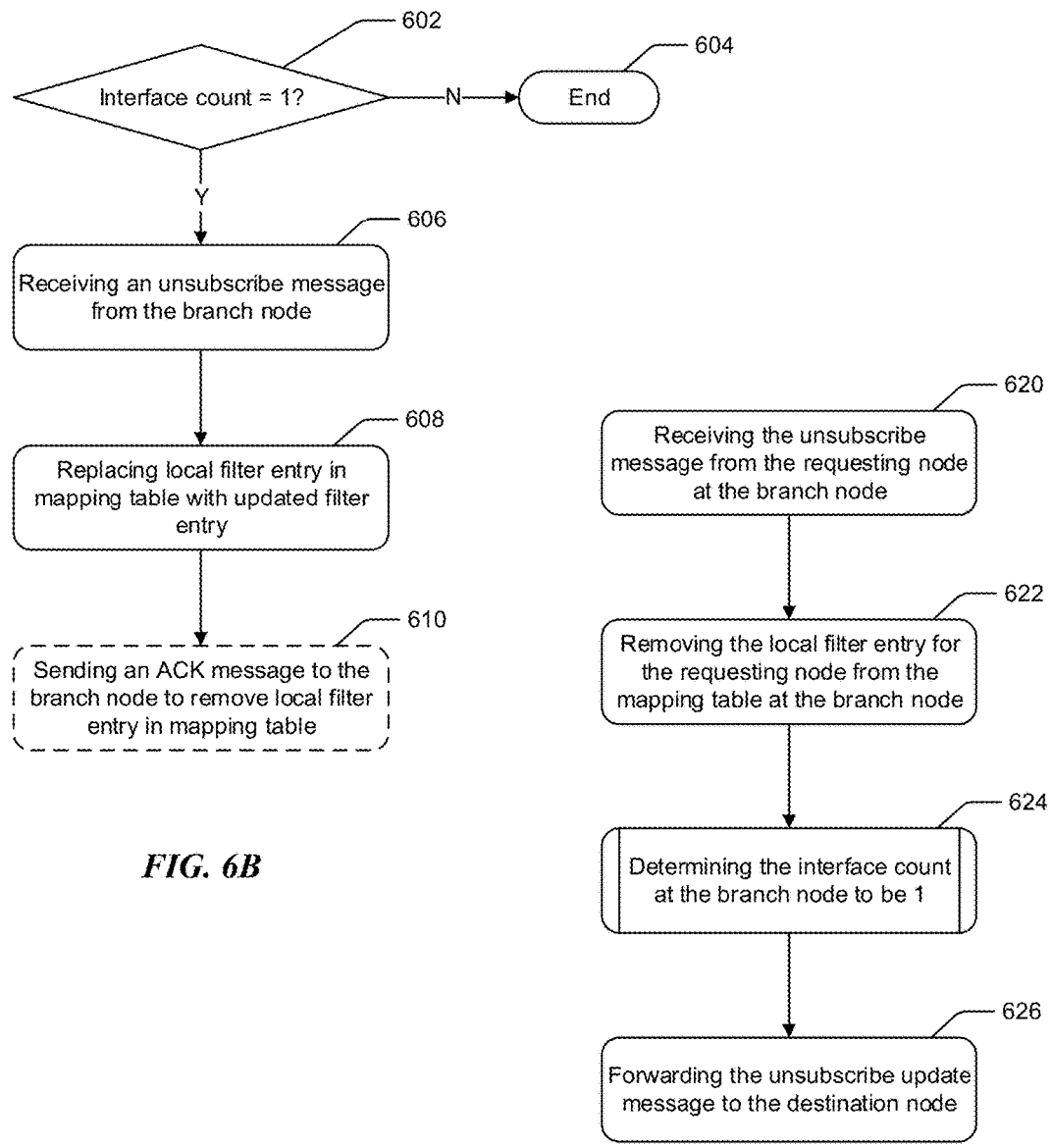

FIGS. 6A-6C illustrate flow diagrams of unsubscribing from the content distribution under a given namespace after completion of subscribing to the network in accordance with FIGS. 4B and 4C. Although a limited number of requesting nodes (subscribers) 401, content routers 402-406 and server 408 are illustrated in the disclosed embodiment, it is appreciated that any number of subscribers, routers and nodes may appear in the network, similar to FIGS. 4B and 5B. The flow has been simplified for ease of discussion.

With reference to FIG. 6A, it is assumed that paths 424, 426 and 428 have already been established as a result of earlier subscription (registration) requests, as described above with reference to FIGS. 5A and 5B. Accordingly, server 408 has a local namespace mapping table with an entry for path 426 (with a packet filter PF 414*) and content router 404 has entries for path 424 (with packet filter PF 410*) and path 428 (with packet filter PF NF (no-filter), 0-F (0-valued filter), or the upstream forwarded filter 412* (with a single-bit indication on whether it is the received or sent filter)).

In the depicted example, requesting node (subscriber) 401 initiates the unsubscribe request. In one embodiment, the unsubscribe request is sent along a notification multicast tree towards the root. As appreciated, the controller 260 may be associated with a global multicast forwarding table that stores location information of each component in the network 102 that is an intended recipient of a frame destined for a given multicast group. The stored location information may also be referred to as control information. The global multicast forwarding table stores a full set of forwarding entries, including a forwarding entry for each multicast group that is used within the networked system of which the controller 260 is part.

Upon receipt of the unsubscribe message by content router 404 (which is the closest branch node to node 401), the content router 404 may remove the packet filter PF 410* from the entry list in its local router for the given namespace. In one embodiment, the content router 404 is able to remove the packet filter from the local namespace mapping table since the unsubscribe message of requesting node 1 results in a single entry remaining in the local namespace mapping table (a single interface with a single packet filter PF NF or 0-F or 412* (with indication that it is the forwarded filter) remains once the interface associated with requesting node 401 is removed).

In order to remove the entry from the local namespace mapping table, however, the content router 404 sends an update message to the server 408 to remove the entry from content router 404. The content router 404 creates an unsubscribe update message, initializes the packet filter to PF 412* sets a hop count value to a matching value for the given interface and forwards the unsubscribe update message to the server 408. Initially, content router 404 removes the entry pointing to node 401 while keeping the entry for node 409.

Once the server 408 receives the unsubscribe update message, the packet filter PF414* in the corresponding entry of the local semi-stateful routing/forwarding table is replaced with the newly received filter PF $414^x$, as explained above. The server 408 then optionally sends an acknowledgement message to content router 404 to remove the entry from its local semi-stateful routing/forwarding table for the given namespace. If no acknowledgment message is sent, either content router 404 requests an update from server 408 to receive a forced acknowledgement from server 408 or content router 404 expires the existing entry after a locally determined timeout period.

Turning to FIGS. 6B and 6C, the flow diagrams illustrate the processes occurring in the diagram of FIG. 6A. The processes disclosed in FIGS. 6B and 6C may be practiced in the environment 100 of FIG. 1, but is not limited thereto. The processes of FIGS. 6B and 6C may be performed by various elements (e.g., routers 106) in FIG. 1, but is not limited to that example network environment 100. For example, a single router 106 may perform all of the steps in the process. It is also appreciated that multiple routers 106 may perform the process to route the request message in a stateless manner.

With reference to FIG. 6B, after the content router 404 determines that the number of interface counts is equal to 1 at 602, the process proceeds to 606. If the number of interface counts is not equal to 1, then the process ends at 604.

At 606, the server 408 receives the unsubscribe update message from the content router (branch node) 404, which prompts the server 408 to replace the packet filter PF 414* in the local semi-stateful routing/forwarding table with the newly received filter PF $414^x$ at 608.

Optionally, at 610, the server 408 may send an acknowledgement message to the content router 404 instructing it to remove the entry from its local semi-stateful routing/forwarding table at the given namespace.

Turning to FIG. 6C, the unsubscribe update message is received from the request node (subscriber) 401 at content router (branch node) 404 at 620. Upon receipt of the unsubscribe update message, the content router 404 removes the local filter entry for the requesting node 401 from its local semi-stateful routing/forwarding table at 622. As part of the process, the content router determines whether the interface count is equal to 1 (as described in 602 above) at sub-process 624.

At 626 the unsubscribe update message is forwarded to the destination node, such as server 408.

FIG. 7 illustrates examples of formats of the request message traversing the network depicted in FIGS. 1, 4B, 5A and 6A. For example, in one embodiment, a request message 702 is an extended format in which the type is an extended filter, which combines the two sub-filters within the same type.

In another embodiment, the request message 704 is an extended format in which the two sub-filters are included separately as type binary filter (such as a bloom filter) and type counting filter FIG. 8 is an example path filter table at different hops in along a network path. As illustrated, the path filter table 800 shows filters at a current hop, with a binary filter value, a counting filter value and a hop count. In the examples of table 800, $f_{i,h(i)}$ represents a transform function corresponding to the $i^{th}$ hop to convert $n_{i-1}$ bits used at the i-1th hop to $n_i$ bits used at the $i^{th}$ hop so as to create a dynamically transformed filter of length matching the local filter's length at the current hop.

Filter$_1$ is the local filter at the first hop that matches the ingress-egress (incoming-outgoing) interface of the content router. For example, at the first hop, filter$_1$ is 0xabcd, where the counter filter value is counter$_1$ with a hop count of 1.Filter$_2$ is an OR operation of the local filter at the second hop that matches the ingress-egress interface at the correct order, $f_{2h(d)}$(Filter$_1$). Thus, filter2 is 0xefghij, where the counter filter value is counter$_2$ with a hop count of 2. Similarly, filter3 is an OR operation of the local filter at the third hop matching the ingress-egress interface, $f_{3h(2)}$(filter$_2$) . In this case, filter$_3$ is 0xklmnopqr, where counter$_3$ is the filter value with a hop count equal to 3.

Figure 9:
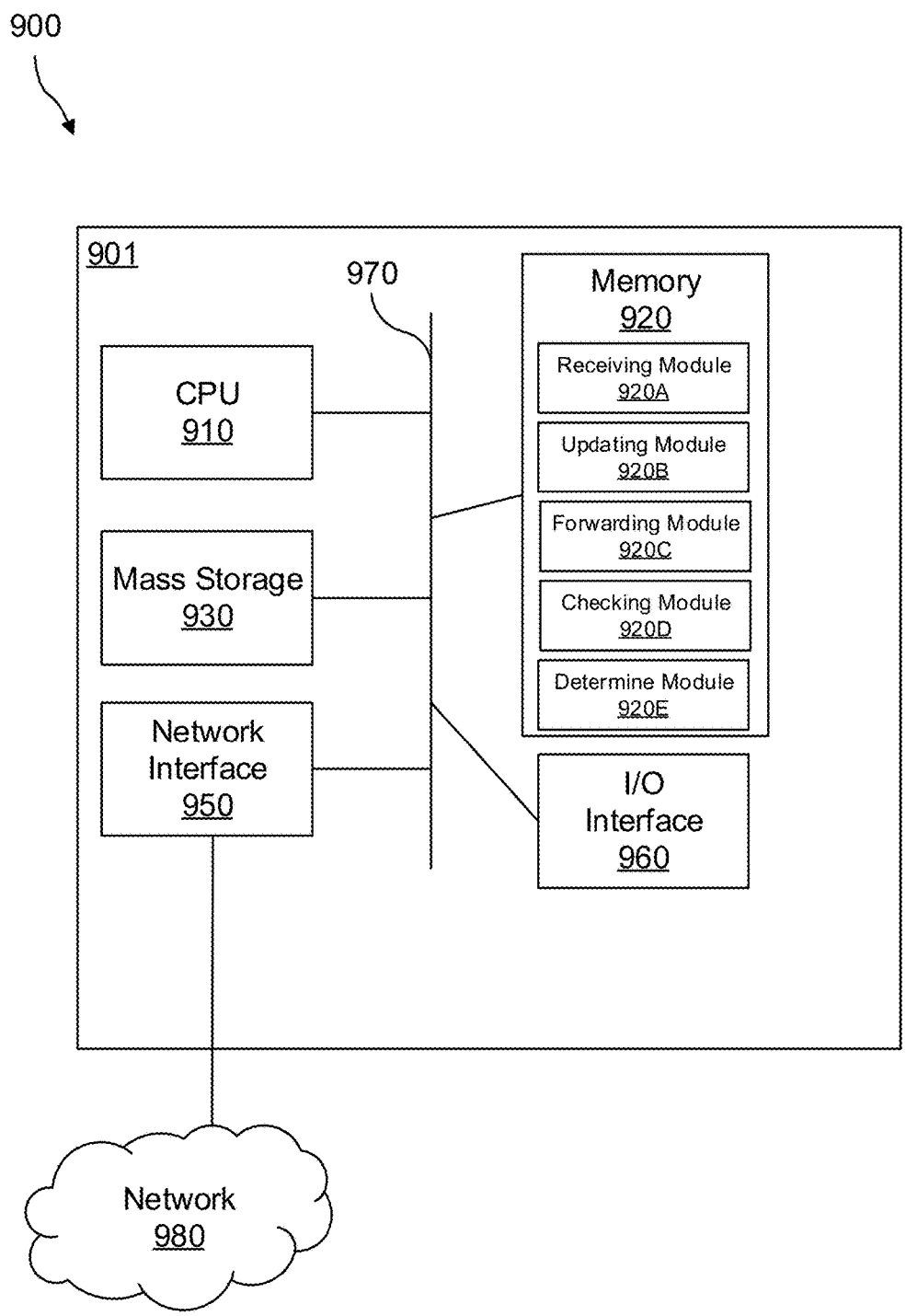
FIG. 9 illustrates a block diagram of a network system that can be used to implement various embodiments.

FIG. 9 is a block diagram of a network device 900 that can be used to implement various embodiments. Specific network devices may utilize all of the components shown, or only a subset of the components, and levels of integration may vary from device to device. Furthermore, the network device 900 may contain multiple instances of a component, such as multiple processing units, processors, memories, transmitters, receivers, etc. The network device 900 may comprise a processing unit 901 equipped with one or more input/output devices, such as network interfaces, storage interfaces, and the like. The processing unit 901 may include a central processing unit (CPU) 910, a memory 920, a mass storage device 930, and an I/O interface 960 connected to a bus 970. The bus 970 may be one or more of any type of several bus architectures including a memory bus or memory controller, a peripheral bus or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. In one embodiment, the memory 920 includes a receiving module 920A to receive a request message including packet filter and hop count field, an updating module 920B to update the request message at each node along an nodal path in the ICN by combining the packet filter with a local filter, a forwarding module 920C to forward the request message with the combined filter to the next hop node, a checking module 920D to check a routing table at a destination node to determine whether content received in the request message matches an existing entry, and a determine module 920E to determine if the existing entry in the local table was received by the same interface as the incoming request message and the combined packet filter is different from the filter stored in the local table.

The mass storage device 930 may comprise any type of storage device configured to store data, programs, and other information and to make the data, programs, and other information accessible via the bus 970. The mass storage device 930 may comprise, for example, one or more of a solid state drive, hard disk drive, a magnetic disk drive, an optical disk drive, or the like.

The processing unit 901 also includes one or more network interfaces 950, which may comprise wired links, such as an Ethernet cable or the like, and/or wireless links to access nodes or one or more networks 680. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

In some embodiments, the methodology provides a resource efficient operation; setup and update overhead is proportional to distance traveled, with the distance limited to scoped notification messages; storage overhead is dependent on number of branches going through a hop, for example, if branch count is <1, no local overhead, and if branch count is ≥1, overhead per namespace is proportional to the number of branches; quick insert-remove operations in regard to subscribe/unsubscribe events to finalize states within the network (at the content routers); and fast convergence to optimal multicast.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for forwarding packets in an information centric network (ICN), comprising:
   receiving a first request message at a node in the ICN, the first request message including a first packet filter and a first hop count field that indicates a number of hops the request message has traveled from a requesting node;
   incrementing the first hop count field at each node traversed by the request message along a nodal path in the ICN;
   updating the first request message at the node by combining the first packet filter with a local filter, wherein the combined titter has a length matching a combination of the first hop count field and a length of the first packet filter, and
   forwarding the first request message with the combined filter to the next hop node of the nodal path until reaching a destination node hosting contents for a namespace.

2. The method of claim 1, further comprising:
   checking a routing table at the destination node to determine whether content received in the first request message matches an existing entry, wherein the existing entry includes a second packet filter; and
   when a match is found,
   determining whether (1) the existing entry in the routing table was received by a same interface as the first request message, and (2) the combined and second packet filters are different;
   sending an update message to traverse the nodal path along the reverse direction towards the requesting node over the ICN until reaching a branch node; and
   receiving a new packet filter at the destination node in response to the update message; and
   updating the routing table to replace the combined and second packet filters having the same interface with the new packet filter.

3. The method of claim 2, further comprising forwarding a response message, including the new filter, with the content requested in the first request message to the requesting node.

4. The method of claim 1, further comprising:
   receiving an unsubscribe message from the branch node when a number of interface counts in the routing table for the name space at the branch node is equal to 1, wherein the unsubscribe message includes an updated filter entry to replace the local filter entry; and
   replacing the local filter entry in the routing table at the destination node with the updated filter entry received from the branch node.

5. The method of claim 4, further comprising sending an acknowledgement message to the branch node to remove the local filter entry from the branch node routing table.

6. The method of claim 4, wherein
   the unsubscribe message is received from the requesting node,
   the filter entry for the requesting node is removed from the routing table at the branch node in response to the unsubscribe message,
   the interface count for the namespace at the branch node is determined to be 1, and
   the unsubscribe message is forwarded to the destination node or another branch node.

7. The method of claim 1, wherein the destination node is one of (1) a server node and (2) a branch node in which multiple request messages have been received from different interfaces.

8. The method of claim 1, wherein
   the packet and local filters are counting bloom filters, and
   the combined filter is determined by a bitwise OR operation on the binary portion of the counting bloom filter, and addition on the counter portion of the counting bloom filter, selected by the branch node or the destination node, dependent upon the hop count and the length of the received counting bloom filter length, and a transformed version of the received packet's counting bloom filter.

9. The method of claim 8, wherein the packet filters are data structures that represent a set of identifiers of all nodes in the nodal path and determines whether an element is a member of the set of identifiers.

10. The method of claim 1, wherein the first packet filter is transformed prior to combination with the local filter when a length of the first packet filter does not match a length of the local filter.

11. A non-transitory computer-readable medium storing computer instructions for forwarding packets in an information centric network (ICN), that when executed by one or more processors, perform the steps of:
receiving a first request message at a node in the ICN, the first request message including a first packet filter and a first hop count field that indicates a number of hops the request message has traveled from a requesting node;
incrementing the first hop count field at each node traversed by the request message along a nodal path in the ICN;
updating the first request message at the node by combining the first packet filter with a local filter, wherein the combined filter has a length matching a combination of the first hop count field and a length of the first packet filter, and
forwarding the first request message with the combined filter to the next hop node of the nodal path until reaching a destination node with a namespace.

12. The non-transitory computer-readable medium of claim 11, wherein the one or more processors further perform the steps of:
checking a routing table at the destination node to determine whether content received in the first request message matches an existing entry, wherein the existing entry includes a second packet filter; and
when a match is found,
determining whether (1) the existing entry in the routing table was received by a same interface as the first request message, and (2) the combined and second packet filters are different;
sending an update message to traverse the nodal path along the reverse direction towards the requesting node over the ICN until reaching a branch node; and
receiving a new packet filter at the destination node in response to the update message; and
updating the routing table to replace the combined and second packet filters having the same interface with the new packet filter.

13. The non-transitory computer-readable medium of claim 11, wherein the one or more processors further perform the steps of:
receiving an unsubscribe message from the branch node when a number of interface counts in the routing table for the name space at the branch node is equal to 1, wherein the unsubscribe message includes an updated filter entry to replace the local filter entry; and
replacing the local filter entry in the routing table at the destination node with the updated filter entry received from the branch node.

14. The non-transitory computer-readable medium of claim 13, wherein the one or more processors further perform the steps of sending an acknowledgement message to the branch node to remove the local filter entry from the branch node routing table.

15. The non-transitory computer-readable medium of claim 13, wherein
the unsubscribe message is received from the requesting node,
the filter entry for the requesting node is removed from the routing table at the branch node in response to the subscribe message,
the interface count for the namespace at the branch node is determined to be 1, and
the unsubscribe message is forwarded to the destination node or another branch node.

16. The non-transitory computer-readable medium of claim 11, wherein
the packet and local filters are counting bloom filters, and
the combined filter is determined by a bitwise OR operation of the binary portion of the counting bloom filter and addition on the counter portion of the counting bloom filter, selected by the branch node of the destination node, dependent upon the hop count and the length of the received counting bloom filter length, and a transformed version of the received packet's counting bloom filter.

17. The non-transitory computer-readable medium of claim 11, wherein the first packet filter is transformed prior to combination with the local filter when a length of the first packet filter does not match a length of the local filter.

18. A network device for forwarding packets in an information centric network (ICN), comprising:
a non-transitory memory storage comprising instructions; and
one or more processors in communication with the memory, wherein the one or more processors execute the instructions to:
receive a first request message at a node in the ICN, the first request message including a first packet filter and a first hop count field that indicates a number of hops the request message has traveled from a requesting node;
increment the first hop count field at each node traversed by the request message along a nodal path in the ICN;
update the first request message at the node by combining the first packet filter with a local filter, wherein the combined filter has a length matching a combination of the first hop count field and a length of the first packet filter; and
forward the first request message with the combined filter to the next hop node of the nodal path until reaching a destination node with a matching namespace.

19. The network device of claim 18, further comprising:
check a routing table at the destination node to determine whether content received in the first request message matches an existing entry, wherein the existing entry includes a second packet filter; and
when a match is found,
determine whether (1) the existing entry in the routing table was received by a same interface as the first request message, and (2) the combined and second packet filters are different;
send an update message to traverse the nodal path along the reverse direction towards the requesting node over the ICN until reaching a branch node; and
receive a new packet filter at the destination node in response to the update message; and update the routing table to replace the combined and second packet filters having the same interface with the new packet filter.

20. The network device of claim 18, further comprising:

receive an unsubscribe message from the branch node when a number of interface counts in the routing table for the name space at the branch node is equal to 1, wherein the unsubscribe message includes an updated filter entry to replace the local filter entry; and replace the local filter entry in the routing table at the destination node with the updated filter entry received from the branch node.

\* \* \* \* \*